United States Patent

[11] 3,625,184

[72] Inventor Paul Patz
Pound, Wis.
[21] Appl. No. 38,095
[22] Filed May 18, 1970
[45] Patented Dec. 7, 1971
[73] Assignee Patz Company
Pound, Wis.

[54] STRAIGHT LINE OVERHEAD CATTLE FEEDER
21 Claims, 11 Drawing Figs.

[52] U.S. Cl. .................................................. 119/52 B
[51] Int. Cl. ........................................................ A01k 05/00
[50] Field of Search ........................................... 119/52, 56, 52 B; 198/110

[56] References Cited
UNITED STATES PATENTS
3,428,027 2/1969 Haen et al. .................. 119/52 R
765,409 7/1904 Witterich .................... 198/110

Primary Examiner—Hugh R. Chamblee
Attorney—James E. Nilles

ABSTRACT: A self-propelled feed distributing apparatus including a feed bunk supported by a number of pairs of vertical frame members, a crossbar connected to each pair of frame members, a traveling conveyor supported on a support assembly pivotally mounted on the crossbars, the traveling conveyor being reciprocally movable longitudinally with respect to the feed bunk, the support assembly including a number of cross members pivotally mounted on the crossbars and movable relative thereto and a pair of rails. The traveling conveyor is driven by a pair of drive wheels operably positioned to engage the rails and is formed by a number of hingedly interconnected sections. A raddle conveyor is provided within the traveling conveyor to move feed, grain or silage within the traveling conveyor in the same direction as the direction of movement of the traveling conveyor with respect to the feed bunk.

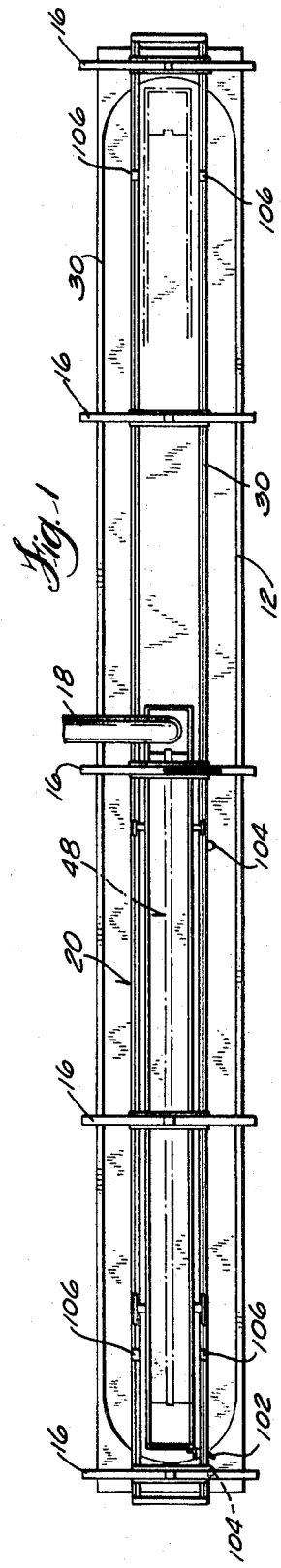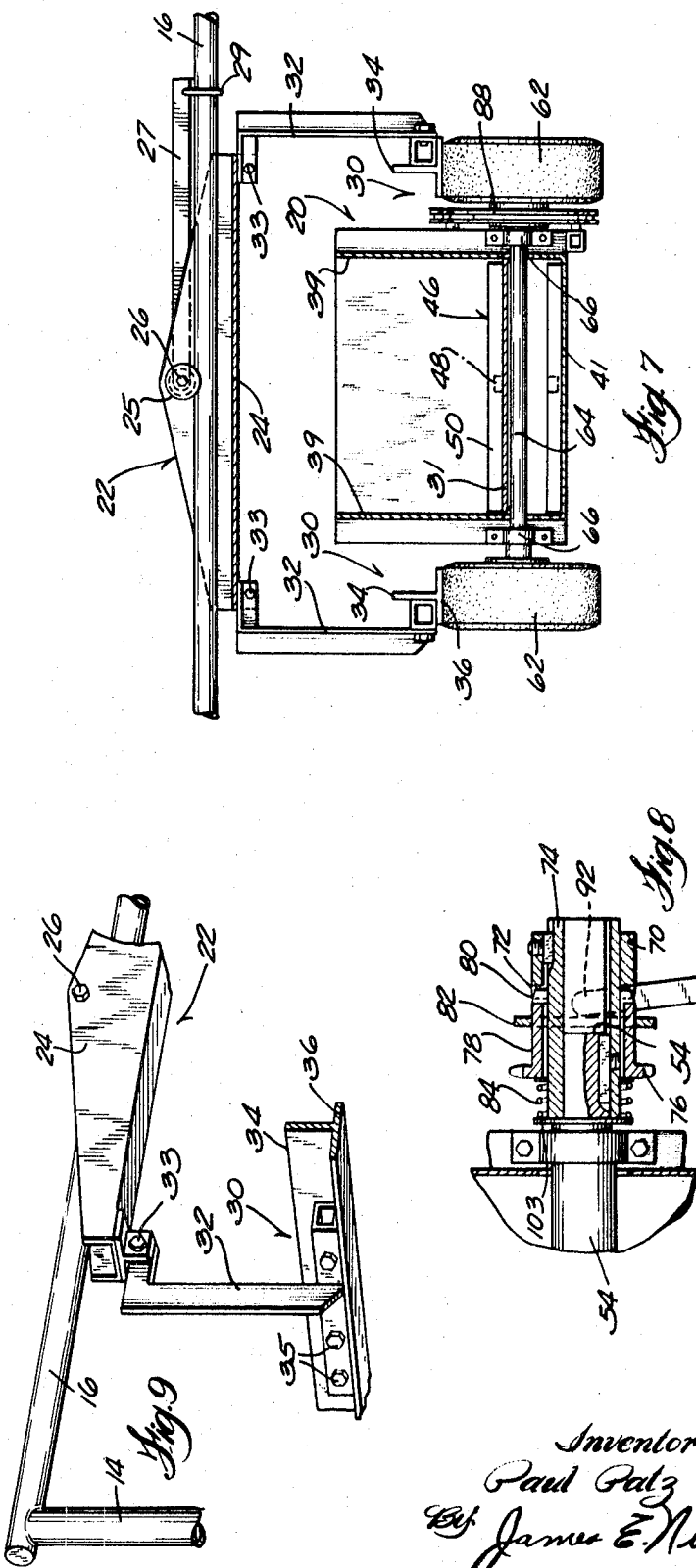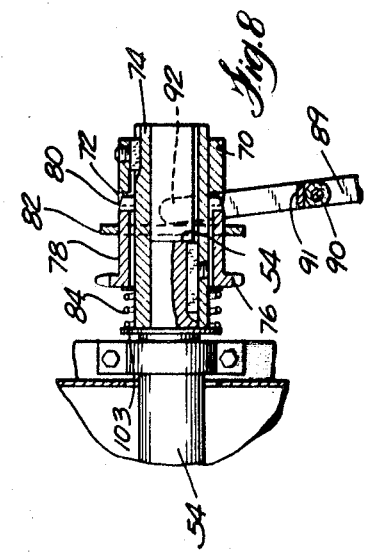

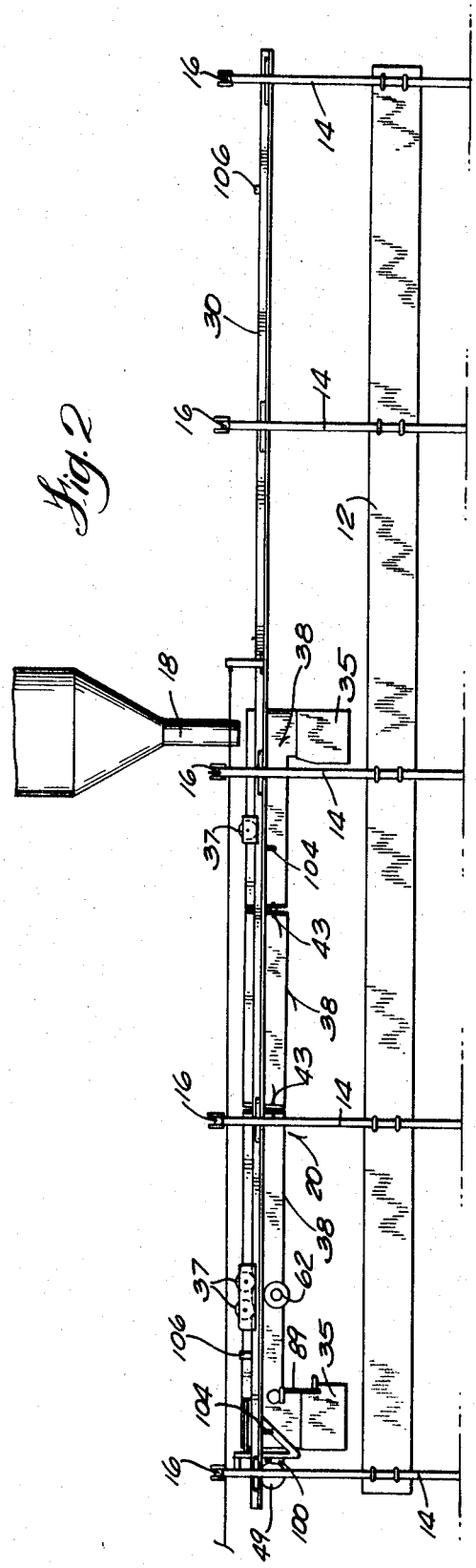

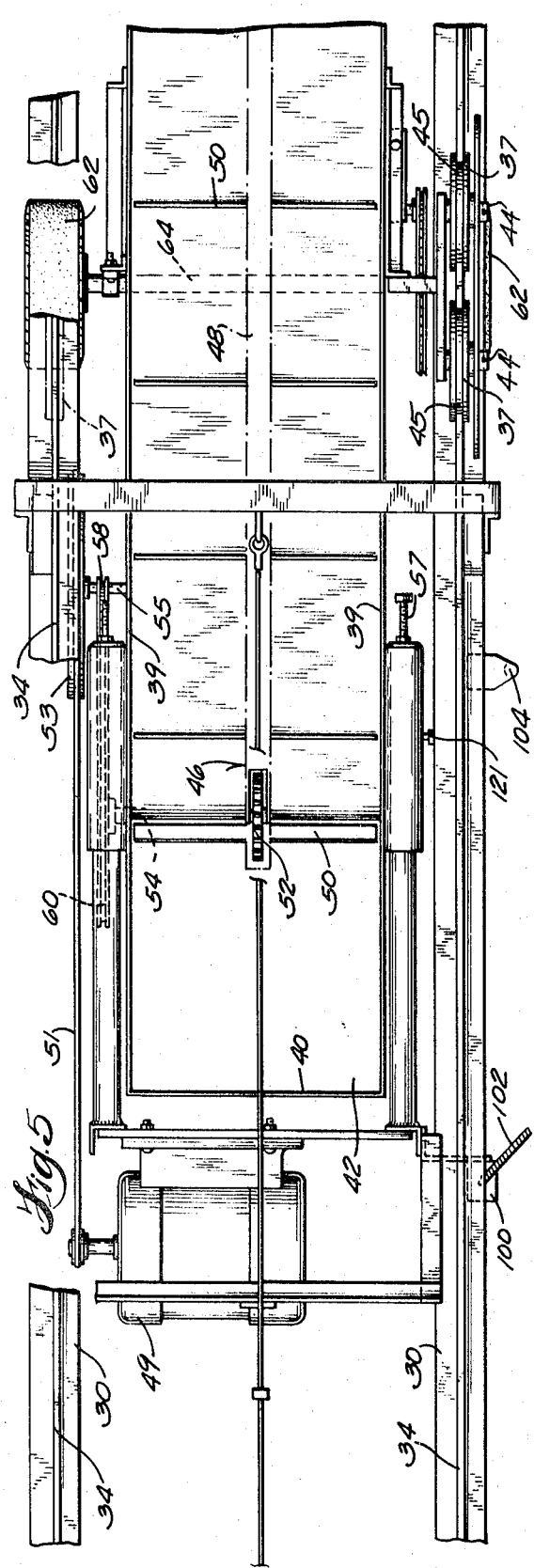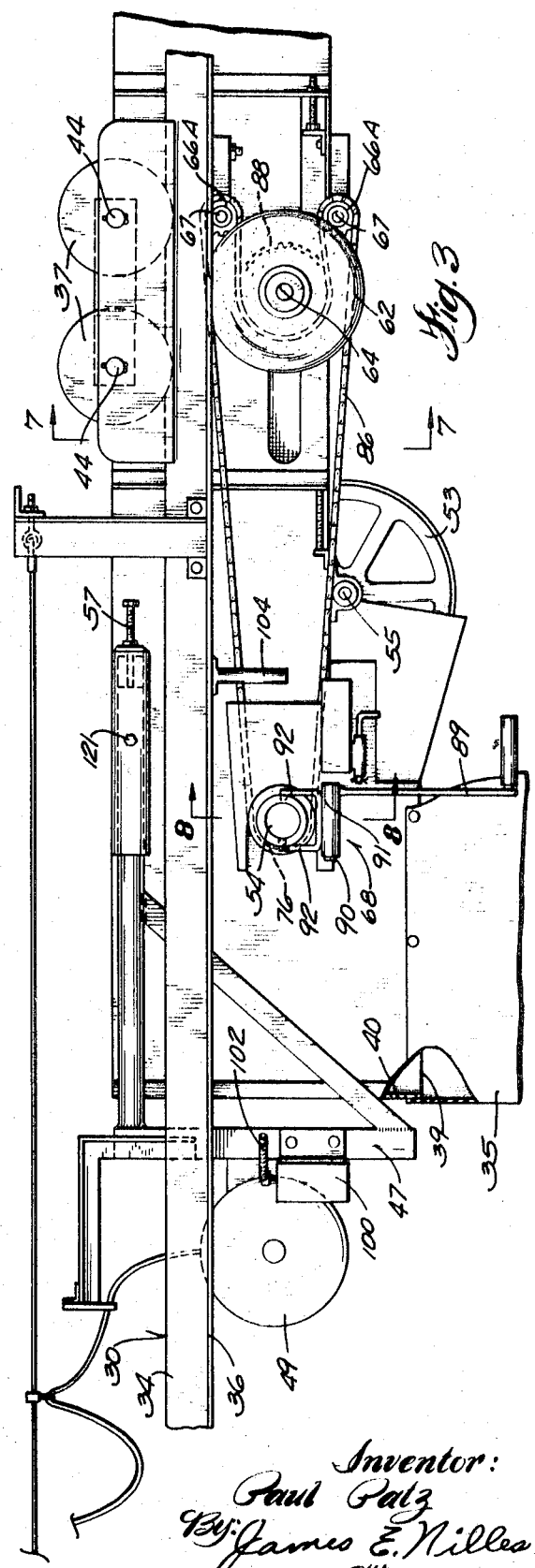

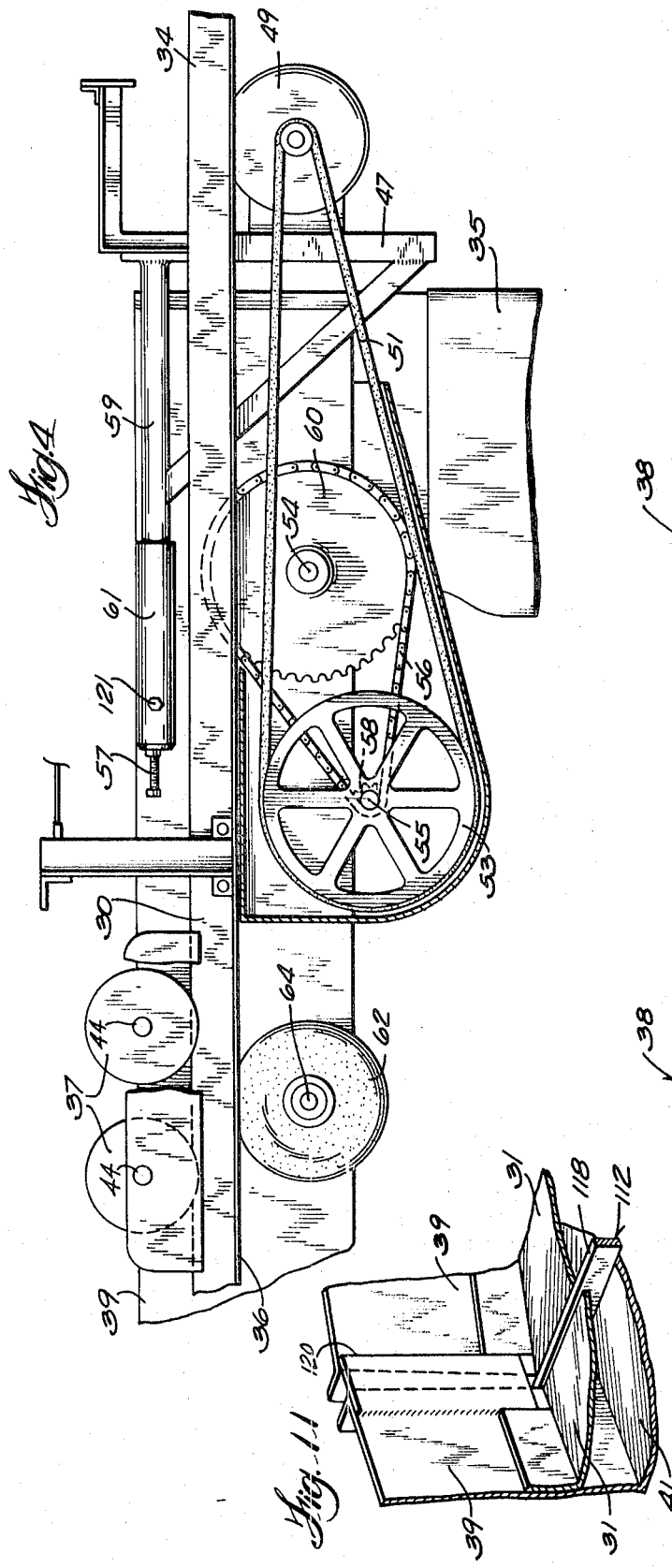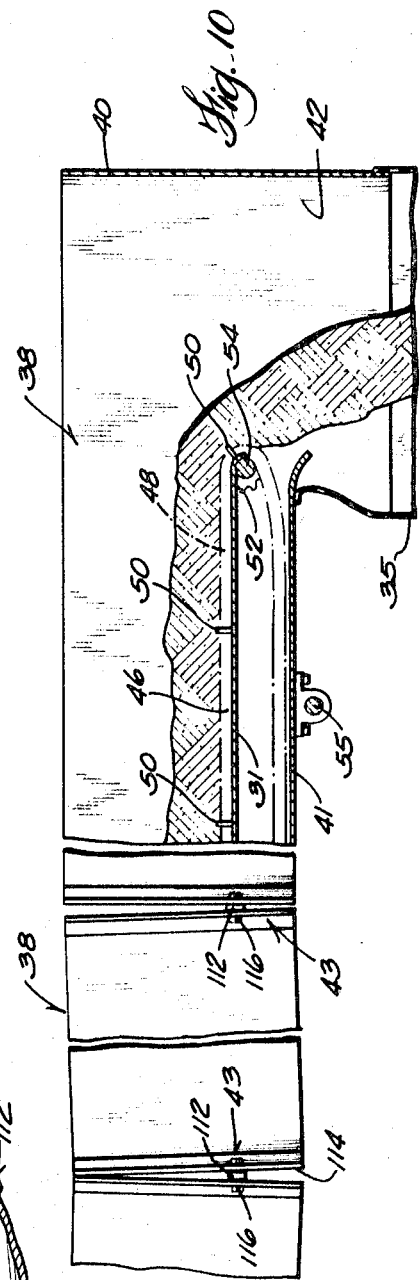

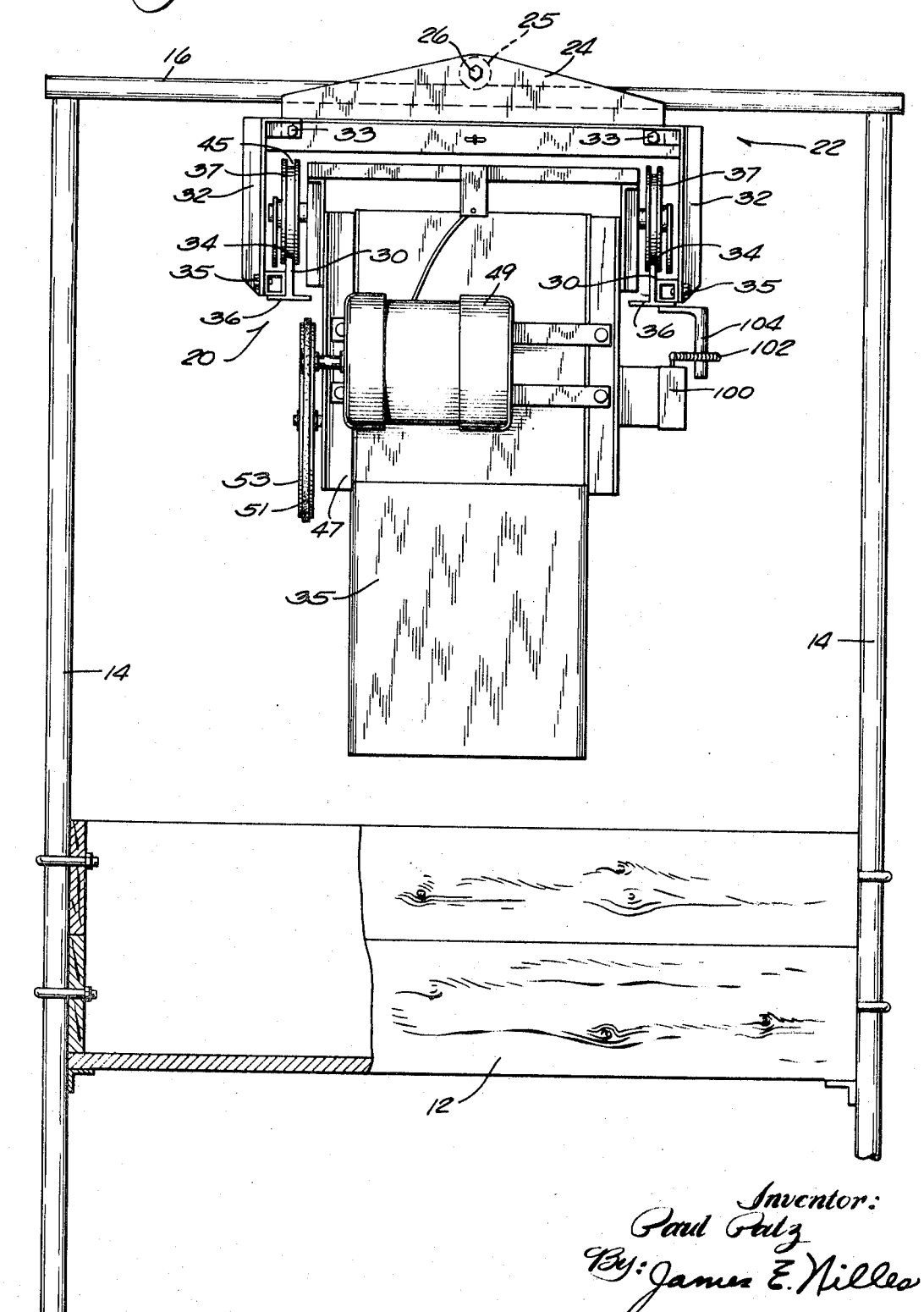

STRAIGHT LINE OVERHEAD CATTLE FEEDER

BACKGROUND OF THE INVENTION

Self-propelled conveyor assemblies of the type shown in Szymanski U.S. Pat. No. 3,342,165 issued Sept. 19, 1967, are being used for the mass feeding of cattle. These assemblies generally include a traveling conveyor which is mounted for reciprocal movement on an overhead frame to distribute feed in a feed bunk. The supporting frames often become misaligned, distorting the rails for the traveling conveyor causing derailment and distortion of the traveling conveyor.

SUMMARY OF THE INVENTION

The self-propelled feed distributing apparatus of the present invention automatically compensates for misalignment of the frame members thereby preventing derailment and distortion of the traveling conveyor. This is accomplished by mounting the traveling conveyor on a pair of generally horizontally disposed rails located on each side of the conveyor. The rails are pivotally attached to the support assemblies which are pivotally mounted on each frame member and are movable relative thereto to compensate for variations in the horizontal position of the crossbars on the frame members. The traveling conveyor includes a raddle conveyor and is formed of a number of hingedly interconnected sections having hinge bars located at the level of the raddle conveyor surface to allow for movement between the sections while maintaining the continuity of the raddle conveyor surface. Driving wheels are used to drive the traveling conveyor along the rails thereby providing even distribution of driving force to each of the two rails. Having the generally horizontal and parallel rails each pivotally connected to the support assemblies makes it possible for the rails to maintain a parallel and self compensating attitude relative to the width between the carriage wheels which are located at intervals along each side of the entire length of the traveling conveyor.

A novel drive arrangement is also provided for the traveling conveyor which makes it possible to stop the traveling conveyor at any point along the length of the feed bunk and to continue to feed grain or silage to that point in the feed bunk.

Other objects and advantages will be apparent from the following description when read in connection with the accompanying drawings.

THE DRAWINGS

FIG. 1 is a top view of the self-propelled feed distributing apparatus of this invention with the traveling conveyor shown at one end of the feed bunk;

FIG. 2 is a side view in elevation of the self-propelled feed distributing apparatus shown in FIG. 1;

FIG. 3 is a view of one side of the apparatus showing the drive arrangement for the traveling conveyor;

FIG. 4 is a view of the other side of the apparatus showing the drive arrangement for the raddle conveyor;

FIG. 5 is a top view of a portion of the traveling conveyor;

FIG. 6 is an end view of the apparatus with a portion of the of feed bunk broken away to show the feed bunk construction;

FIG. 7 is a view taken on line 7—7 of FIG. 3 showing the traveling conveyor drive wheels;

FIG. 8 is a view taken on line 8—8 of FIG. 3 showing the manual clutch assembly;

FIG. 9 is a perspective view of a portion of one of the support assemblies;

FIG. 10 is a side view of a portion of the traveling conveyor showing the hinge connections between the sections forming the conveyor trough;

FIG. 11 is a perspective view of a portion of the traveling conveyor trough showing the hinge connection.

DESCRIPTION OF THE INVENTION

The self-propelled feed distributing apparatus 20 of the present invention as seen in FIGS. 1, 2 and 6 generally includes a long feed bunk 12 supported by a number of pairs of vertical frame members 14 connected by crossbars 16. Feed in the form of grain or silage is fed to the center of the long feed bunk 12 by means of a fixed or stationary overhead conveyor 18 and is distributed throughout the length of the feed bunk by means of a traveling conveyor 20. The traveling conveyor 20 is supported on the crossbars 16 by means of a support assembly 22 which is pivotally and movably mounted on the crossbars 16. The traveling conveyor 20 is approximately one-half the length of the feed bunk 12 and is reciprocally moved on the rails 30 to distribute feed along the full length of the feed bunk 12. This type of feed distributing apparatus makes it possible to evenly distribute feed over the full length of the feed bunk 12 and to deposit feed at any point along the length of the feed bunk 12 by using a traveling conveyor 20 which is only one-half the length of the feed bunk 12.

THE SUPPORT ASSEMBLY

In accordance with one aspect of the invention, the traveling conveyor 20 is retained in substantial alignment regardless of the alignment of the frame members 14 by means of the support assembly 22. In this regard, and referring to FIGS. 6, 7 and 9, the support assembly 22 includes a number of channel or support members 24 which are pivotally supported on the crossbars 16 by means of roller 25 mounted on a pivot pin 26. The support members 24 are free to pivot about the pivot pins 26 and to move on the crossbars 16. It should be apparent that in the event the frame members 14 become misaligned, the support members 24 will move to an alignment position maintaining the traveling conveyor 20 in a straight line at all times in its movement reciprocally over the feed bunk.

At two locations approximately one-third of the way from each end of the feed bunk 12, means are provided for retaining the support assembly near the center of the feed bunk 12 in a stationary or fixed position so that the traveling conveyor 20 does not move fully to one side or the other of the feed bunk 12. Such means, as shown in FIG. 7, is in the form of a bar 27 secured to the pivot pin 26, and a U-clamp 29 secured to the crossbar 16. The clamp 29 can be adjusted relative to the crossbar 16 to center the traveling conveyor 20 over the feed bunk 12.

Means are provided for supporting the traveling conveyor 20 for longitudinal movement relative to the feed bunk 12. Such means is in the form of a pair of rails or guides 30 connected to support arms 32 which are pivotally connected to each end of the channel members 24 by bolts 33. The rails 30 are formed from inverted T-bars which define a track 34 for the traveling conveyor 20 and a drive surface 36 for driving the traveling conveyor 20 along the rails 30. The rails 30 can be secured to the support arms 32 by any appropriate means such as bolts 35. The rails 30 are free to move or swing about the end of the crossmembers 24 by means of the pivotal connection of the support arms 32 to the crossmembers 24.

THE TRAVELING CONVEYOR

The traveling conveyor 20 is formed of a number of sections 38 and is supported on the rails 30 by means of carriage wheels 37 provided at spaced intervals along each side of the conveyor 20. In this regard, and referring to FIGS. 5, 10 and 11, the traveling conveyor sections 38 each have sidewalls 39, an intermediate panel 31, and a bottom 41. The end sections are provided with an end spout 40 with an opening 42 for discharging feed from the conveyor 20 down into feed bunk 12. The length of the traveling conveyor 20 can be varied by adding additional sections 38 as required. The sections 38 are hingedly connected at their open ends by means of hinge assemblies 43 to prevent buckling of the traveling conveyor 20 due to variations in the height of the rails 30 as more particularly described hereinafter.

The carriage wheels 37 are mounted to rotate freely on stub shafts 44 provided on the sidewalls 39 of the conveyor 20 and are positioned to ride on the tracks 34 of the rails 30. The number of carriage wheels 37 provided on each sidewall depends on the length of the traveling conveyor 20. The carriage wheels 37 are shown in the form of sheaves having grooves 45 which are mounted on the tracks 34. In the event of any variation in the spacing of the carriage wheels 37, the rails 30 will move either inwardly or outwardly at pivot point 33 to automatically compensate for such change.

Feed fed to the traveling conveyor 20 from the fixed conveyor 18 is carried to one of the end openings 42 by means of a chain or raddle conveyor 46 (FIGS. 5 and 10). Raddle conveyor 46 includes a central chain 48 and a number of flites 50 extending outwardly from each side of the chain 48. The conveyor 46 orbits around the intermediate panel 31 located in the traveling conveyor 20. A drive sprocket 52 mounted on a drive shaft 54 is provided at one end of the panel 31 and an idler sprocket (not shown) is provided at the other end of panel 31. The raddle conveyor is moved in the same direction of movement as the traveling conveyor in order to carry feed fed to the conveyor to the opening 42. A chute 35 can be provided below each of the openings 42 to direct the feed into the feed bunk 12.

Raddle conveyor 46 is driven (FIGS. 3 and 4) by means of an electric motor 49 mounted on a bracket 47 provided on one end of the traveling conveyor 20. Electric motor 49 is a reversible type electric motor connected by a V-belt 51 to a speed reducing sheave 53 which is mounted on a shaft 55 journaled on the bottom of the bottom 41. The motion of the sheave 53 is transferred to the raddle conveyor drive shaft 54 by a chain 56 mounted on a small sprocket 58 on the shaft 55, and a large sprocket 60 mounted on the shaft 54. The belt 51 is tightened by adjusting the position of the bracket 47 with respect to the end of the traveling conveyor 20. This is accomplished by turning the set screw 57 to move bracket arm 59 relative to a fixed support 61 and is locked in position by tightening set screw 121.

The traveling conveyor 20 is driven along the rails 30 by means of a pair of drive wheels 62 provided on each side of the conveyor 20. The wheels 62 are mounted on an axle 64 which is journaled for rotation in bearings 66 (see FIG. 7) provided on the sidewalls 39. The wheels 62 are positioned to engage the drive surfaces 36 on the rails 30 and are located below the carriage wheels 37 which maintain constant pressure between the driving wheels 62 and the driving surface 36. By providing a drive wheel 62 on each side of the conveyor an even distribution of driving force is provided to both sides of the conveyor 20. Although air inflated rubber tires are shown in the drawing, any type of drive wheel could be substituted for the rubber wheels 62, such as a cog wheel.

CONVEYOR DRIVE CONTROL CLUTCH

Means are provided for selectively interrupting the movement of the traveling conveyor 20 whenever it is desired to feed grain or silage to a predetermined point in the feed bunk 12. Such means is in the form of a manually actuated clutch 68 which is mounted on the end of the conveyor drive shaft 54 as seen in FIGS. 3 and 8. The clutch 68 includes a fixed clutch member 70 having a number of drive dogs 72 and is secured to an adapter sleeve 74. The adapter sleeve 74 is secured on the drive shaft 54. A drive sprocket 76 and a movable clutch member 78 are provided on the sleeve 74. The clutch member 78 has a number of driven dogs 80 and a radially directed flange 82. The clutch member 78 is biased by a spring 84 to apply pressure between a stationary washer 103 and the movable clutch member 78 forcing the movable clutch member 78 toward the fixed clutch member 70. On engagement of the dogs 80 on the slideable member 78 with the dogs 72 on the fixed member 70, the motion of shaft 54 will be transferred directly to the sprocket 76. The motion of the drive sprocket 76 is transferred to the drive wheels 62 by chain 86 mounted on the drive sprocket 76 and on a driven sprocket 88 provided on the wheel axle 64. Idler sprockets 66A mounted on stub shaft 67 are used to reverse the direction of motion of the wheels 62 so that the raddle conveyor 46 moves feed in the same direction as the direction of movement of the traveling conveyor 20.

The movable clutch member 78 is disengaged from the fixed member 70 by means of a handle 89 which is pivotally mounted on a pivot pin 90 provided on a bracket 91 on the sidewall of the conveyor 20. The handle 89 includes a pair of upwardly directed arms or fingers 92 which are positioned to engage the flange 82 on the movable clutch member 78. The handle 89 is pulled outward to push the movable clutch member 78 away from the fixed clutch member 70 and against the force of spring 84 to disengage the clutch. On disengagement of the clutch, movable clutch member 78 with sprocket 76 will idle on the adapter sleeve 74 stopping the wheels 62. However, the raddle conveyor 46 will continue to operate moving feed to the desired point in the feed bunk. On release of the handle 89, the spring 84 will move the clutch member 78 into engagement with the clutch member 70 and the traveling conveyor will continue to operate.

Means are provided for reversing the direction of motion of the traveling conveyor 20 each time the conveyor 20 approaches one end of the feed bunk 12. Such means, as seen in FIGS. 1, 3 and 5, is in the form of a reversible switch 100 mounted on the motor bracket 47 and having an actuating arm 102 extending outwardly from the side of the traveling conveyor 20. Fixed stops 104 are provided near one end of the rails 30 and approximately intermediate the length of rail 30 in a position to engage the arm 102. On movement of the traveling conveyor 20 past one of the stops 104, the arm 102 will engage fixed stop 104 tripping the switch 100 and reversing the direction of rotation of the motor 49. The traveling conveyor 20 and raddle conveyor 46 will then move in the opposite direction until the arm 102 engages the other stop 104 tripping the switch and again reversing the direction of motion of the motor. In the event the trip mechanism fails to reverse the motor, the traveling conveyor 20 is prevented from running off the rails 30 by means of fixed stops 106 provided at each end of the rails 30.

Means are provided for compensating for any variation in the height of the crossmembers 16 to prevent buckling of the traveling conveyor 20. Such means is in the form of the hinge assemblies 43 (FIGS. 10 and 11) provided between the sections 38 which form the traveling conveyor 20. The hinge assemblies 43 each include a hinge bar 112 positioned between the ends of the intermediate panels 31 and flanges 114 provided on the ends of sidewalls 39. The bar 112 is retained in the gap between the sections 38 by bolts 116. The upper surface 118 of the hinge bar 112 is located in a coplanar relation with the upper surface of the intermediate panel 31 to provide a continuous surface for the raddle conveyor 46. Feed is prevented from escaping through the gap between the flanges on the sidewalls 39 by means of a plate 120 mounted on the inside of one of the sidewalls 39.

RESUME

The self-propelled feed distributing apparatus disclosed herein automatically compensates for variations in the horizontal and vertical displacement of the feed bunk support members to thereby minimize distortion and derailment of the traveling conveyor 20. This is accomplished by supporting the traveling conveyor 20 on support assemblies 22 that are free to pivot on the crossmembers 16 to maintain the level of the traveling conveyor 20. The rails 30 are free to move laterally to adjust to variations in the spacing of the carriage wheels 37.

A novel drive control is provided to allow for the distribution of feed, grain or silage to any point in the feed bunk. This control includes a manual clutch 68 which can be used to interrupt the operation of the drive wheels 62 without interrupting the operation of the raddle conveyor 46. Feed from the stationary conveyor 18 will be carried by the raddle conveyor 46 in the direction of motion of the traveling conveyor 20 to the opening 42 where it will drop into the feed bunk 12.

The traveling conveyor 20 automatically compensates for variations in the height of the crossmembers 16 by means of the hinge assemblies 43. These assemblies 43 allow the sections 38 to pivot relative to each other and thereby prevent buckling of the traveling conveyor 20. Each assembly 43 includes a bar 112 having an upper surface 118 located at the same level as the surface of the intermediate panel 31 to maintain the continuity of the surface for the raddle conveyor 46.

I claim:

1. A self-propelled feed distributing apparatus for mass feeding of livestock, said apparatus comprising:
   a feed bunk,
   a frame for supporting said feed bunk and having a number of crossbars,
   a conveyor support assembly pivotally mounted on each of said crossbars,
   a traveling conveyor having an opening at each end mounted for reciprocal movement on said support assemblies,
   and means for reciprocally moving said traveling conveyor on said support assemblies.

2. The apparatus according to claim 1 including a pair of longitudinally extending rails pivotally connected to said support assemblies and said moving means includes a pair of drive wheels positioned to operatively engage said rails.

3. The apparatus according to claim 1 wherein said traveling conveyor includes a number of sections hingedly interconnected to form a continuous conveyor trough.

4. The apparatus according to claim 1 wherein said moving means includes a pair of drive wheels.

5. The apparatus according to claim 1 wherein said moving means includes means for stopping said conveyor assembly at any point relative to the feed bunk.

6. The apparatus according to claim 1 wherein each of said support assemblies includes a cross member and a roller secured to said crossmember for supporting said crossmember on said crossbars.

7. The apparatus according to claim 1 including a raddle conveyor in said traveling conveyor and said moving means includes means for driving said raddle conveyor in the same direction as the travelling conveyor.

8. The apparatus according to claim 7 including means for selectively interrupting the motion of said traveling conveyor without interrupting the operation of said raddle conveyor.

9. An automatic bunk feeder comprising
   a feed bunk
   a traveling conveyor supported for reciprocal movement longitudinally of said feed bunk,
   a raddle conveyor mounted within said travel conveyor,
   means for pivotally supporting said traveling conveyor over said feed bunk,
   and means for simultaneously driving said raddle conveyor and said traveling conveyor in the same direction.

10. The bunk feeder according to claim 9 including means for interrupting the motion of said traveling conveyor.

11. The bunk feeder according to claim 9 wherein said pivotal supporting means is movable laterally with respect to said feed bunk.

12. The bunk feeder according to claim 9 including support assemblies for supporting said traveling conveyor for longitudinal movement relative to said feed bunk, said assemblies each including a crossmember having a pivot pin for pivotally and movably supporting said crossmember and means for fixing two of said crossmembers relative to said feed bunk.

13. The bunk feeder according to claim 9 wherein said traveling conveyor includes a number of sections each having an intermediate panel and means for hingedly connecting adjacent sections together.

14. The bunk feeder according to claim 13 wherein said connecting means includes a spacer bar positioned between adjacent sections to form a continuous surface along said intermediate panel of said traveling conveyor.

15. A bunk feeder comprising:
   a feed bunk,
   a number of pairs of frame members secured to said bunk at spaced intervals,
   a crossbar connecting each pair of frame members,
   a a support assembly pivotally mounted on each of said crossbars and including a pair of longitudinally extended rails pivotally connected to each of said support assemblies,
   a traveling conveyor mounted on said rails for reciprocal movement longitudinally of said feed bunk,
   said traveling conveyor including a raddle conveyor,
   and means for reciprocally moving said traveling conveyor on said support assembly and simultaneously driving said raddle conveyor.

16. The bunk feeder according to claim 15 including means for interrupting the movement of said traveling conveyor.

17. The bunk feeder according to claim 15 wherein each of said support assemblies includes a crossmember pivotally mounted on one of said crossbars and being movable on said crossbars laterally with respect to said feed bunk, two of said crossmembers being fixedly secured to the corresponding crossbar to maintain said bunk feeder in a desired position over said feed bunk.

18. The bunk feeder according to claim 15 wherein said traveling conveyor driving means includes a pair of drive wheels operatively positioned to engage said longitudinally extended rails.

19. The bunk feeder according to claim 18 wherein said support assembly includes a pair of inverted T-bars for supporting said traveling conveyor, said drive wheels being positioned to engage said inverted T-bars.

20. The bunk feeder according to claim 15 wherein said traveling conveyor includes a number of sections having sidewalls, a bottom and an intermediate panel, and a hinge assembly between the ends of adjacent sections.

21. The bunk feeder according to claim 20 wherein said hinge assemblies each include a spacer bar between the adjacent ends of the intermediate panel, the upper surface of the space bar being located on the same plane as the plane of the intermediate panel.

* * * * *